US008504520B2

(12) United States Patent
Davydok et al.

(10) Patent No.: US 8,504,520 B2
(45) Date of Patent: Aug. 6, 2013

(54) BACKGROUND SYNCHRONIZATION OF DATA OBJECTS

(75) Inventors: Dmitri Davydok, Bellevue, WA (US); Indrojit Deb, Sammamish, WA (US); Tong Gao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/814,234

(22) Filed: Jun. 11, 2010

(65) Prior Publication Data

US 2011/0307445 A1    Dec. 15, 2011

(51) Int. Cl.
*G06F 17/30* (2006.01)

(52) U.S. Cl.
USPC .......... 707/619; 707/610; 707/612; 707/613; 707/614; 707/617; 707/618; 707/620; 707/624

(58) Field of Classification Search
USPC ............... 707/619, 610, 612, 613, 614, 617, 707/618, 620, 624
See application file for complete search history.

(56) References Cited

U.S. PATENT DOCUMENTS

| | | | | |
|---|---|---|---|---|
| 5,917,489 | A | 6/1999 | Thurlow et al. | 715/809 |
| 6,163,749 | A * | 12/2000 | McDonough et al. | 701/438 |
| 6,522,644 | B2 * | 2/2003 | Bergkvist | 370/350 |
| 6,553,409 | B1 * | 4/2003 | Zhang et al. | 709/213 |
| 6,976,077 | B1 * | 12/2005 | Lehew et al. | 709/229 |
| 7,007,026 | B2 * | 2/2006 | Wilkinson et al. | 1/1 |
| 7,529,780 | B1 * | 5/2009 | Braginsky et al. | 1/1 |
| 7,707,186 | B2 * | 4/2010 | LeCrone et al. | 707/656 |
| 7,778,960 | B1 * | 8/2010 | Chatterjee et al. | 707/609 |
| 7,877,797 | B2 * | 1/2011 | Rasmussen et al. | 726/17 |
| 8,010,485 | B1 * | 8/2011 | Chatterjee et al. | 707/609 |
| 2003/0115186 | A1 * | 6/2003 | Wilkinson et al. | 707/3 |
| 2005/0283564 | A1 * | 12/2005 | LeCrone et al. | 711/100 |
| 2006/0080363 | A1 | 4/2006 | Vadlamani et al. | 1/1 |
| 2006/0184868 | A1 * | 8/2006 | Chen et al. | 715/500.1 |
| 2007/0150499 | A1 | 6/2007 | D'Souza et al. | 1/1 |
| 2007/0220590 | A1 * | 9/2007 | Rasmussen et al. | 726/4 |
| 2007/0255920 | A1 * | 11/2007 | Gold | 711/170 |
| 2008/0046437 | A1 * | 2/2008 | Wood | 707/10 |
| 2008/0208919 | A1 | 8/2008 | i Dalfo et al. | 1/1 |
| 2011/0093948 | A1 * | 4/2011 | Rasmussen et al. | 726/17 |
| 2011/0264759 | A1 * | 10/2011 | Perantatos et al. | 709/217 |

FOREIGN PATENT DOCUMENTS

WO    WO 2005071990 A1 *    8/2005
WO    WO 2008026823 A1 *    3/2008

OTHER PUBLICATIONS

MSDN; "Using MAPI to Create Outlook 2007 Items"; Jun. 2008; accessed May 11, 2010 at http://msdn.microsoft.com/en-us/library/cc678348.aspx; 13 pgs.

(Continued)

*Primary Examiner* — Frantz Coby
(74) *Attorney, Agent, or Firm* — Merchant & Gould

(57) ABSTRACT

Background synchronization of data objects may be provided. A background thread associated with an application may be created. A first data item associated with the application may be opened by the background thread and a copy of the first data item may be created. A modification may be performed on a property of the first data item. If no second data item is associated with a pending modification, the first data item may be replaced with the modified copy of the first data item.

20 Claims, 4 Drawing Sheets

OTHER PUBLICATIONS

William_wchg / Hexun.com/bookworm; "*MAPI Feature Overview*" Dec. 11, 2009; accessed May 11, 2010 at http://bookwrom.blog.hexun.com/40191399_d.html; 10 pgs.

MSDN; "*Avoiding Excessive Security Warnings when Sending Automated E-mail Messages*"; Jun. 2004; accessed May 11, 2010 at http://msdn.microsoft.com/en-us/library/aa168346%28office.11%29.aspx; 6 pgs.

Microsoft Dynamics; "*Outlook Synchronization in Microsoft Dynamics CRM*"; Jan. 2010; http://www.fmtconsultants.com/SiteCollectionDocuments/Outlook_Synchronization_in_MS_CRM_4.0.pdf; 18 pgs.

Streblechenko, D.; "*What is Outlook Redemption?*"; May 9, 2008; http://www.dimastr.com/redemption/; 2 pgs.

MSDN; "Outlook as a Platform"; accessed May 11, 2010 at http://msdn.microsoft.com/en-us/library/cc513842.aspx; 27 pgs.

Bramson, et al., White Paper entitled "Microsoft Exchange Server 2003 ActiveSync Architecture," dated Jul. 2008; 12 pages.

Programmer's Guide for ActiveSync, Windows CE 2.1 of Microsoft Corporation, Oct. 1998; 127 pages. Available at: http://msdn.microsoft.com/en-us/library/ms834164.aspx.

\* cited by examiner

BACKGROUND SYNCHRONIZATION OF DATA OBJECTS

BACKGROUND

Background synchronization of data objects is a process for applying bulk changes to objects in a data store. In some situations, sets of changes may need to be applied in bulk to the items in a data store, such as a Messaging Application Programming Interface (MAPI) compliant application's data objects. For example, sets of items may need to be mirrored from a customer relationship management (CRM) system to an e-mail application store or a data set may need to be imported into a MAPI store. In conventional systems, main application threads are blocked while the bulk data operation is performed. This may result in users experiencing delays and non-responsive applications.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Background synchronization of data objects may be provided. A background thread associated with an application may be created. A first data item associated with the application may be opened by the background thread and a copy of the first data item may be created. A modification may be performed on a property of the first data item. If no second data item is associated with a pending modification, the first data item may be replaced with the modified copy of the first data item.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
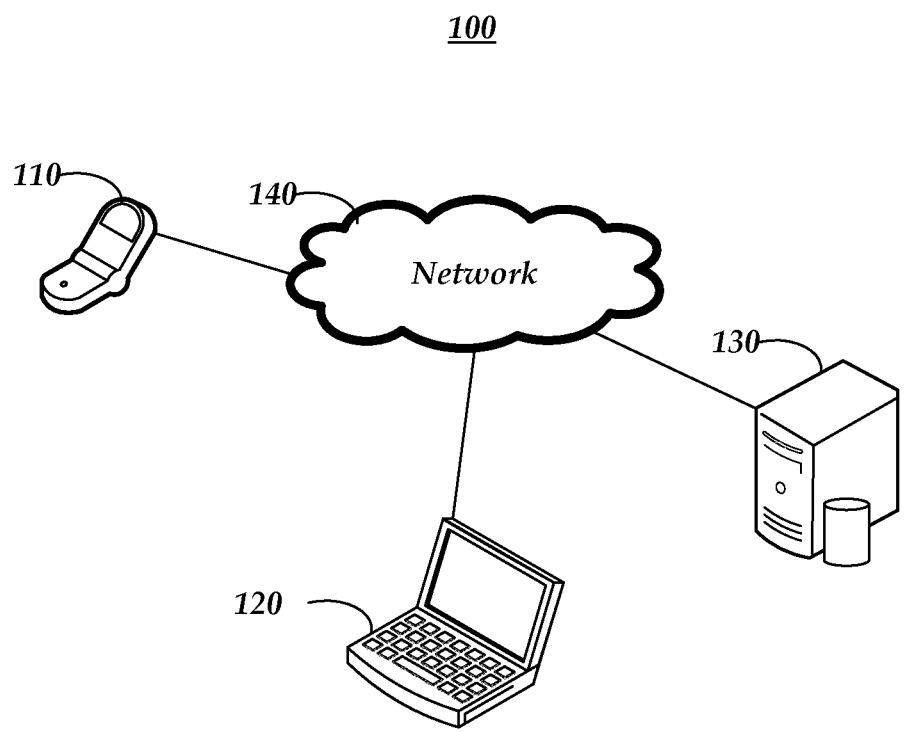
FIGS. 1A-1B are block diagrams of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Background synchronization of data objects may be provided. Consistent with embodiments of the present invention, the modification of data items may be allowed without blocking an application's main thread for the duration of those operations. The data items may be accessed through a MAPI interface to allow multithreaded modifications without impacting application responsiveness.

FIG. 1A is a block diagram illustrating an operating environment 100 for providing background synchronization of data objects. Operating environment 100 may comprise a plurality of computers, such as a computing device 300 described below in greater detail with respect to FIG. 3. The plurality of computers may comprise a mobile device 110, such as a cellular phone, a personal computer 120, such as a laptop, and a data server 130. Mobile device 110, personal computer 120, and/or data server 130 may be communicatively coupled via a network 140. Network 140 may comprise a private network, such as a company's local area network (LAN), and/or a public network, such as the Internet. Consistent with embodiments of the invention, mobile device 110, personal computer 120, and/or data server 130 may be communicatively coupled via a direct hardware connection, such as a Universal Serial Bus (USB) connection (not shown).

Figure 1B:
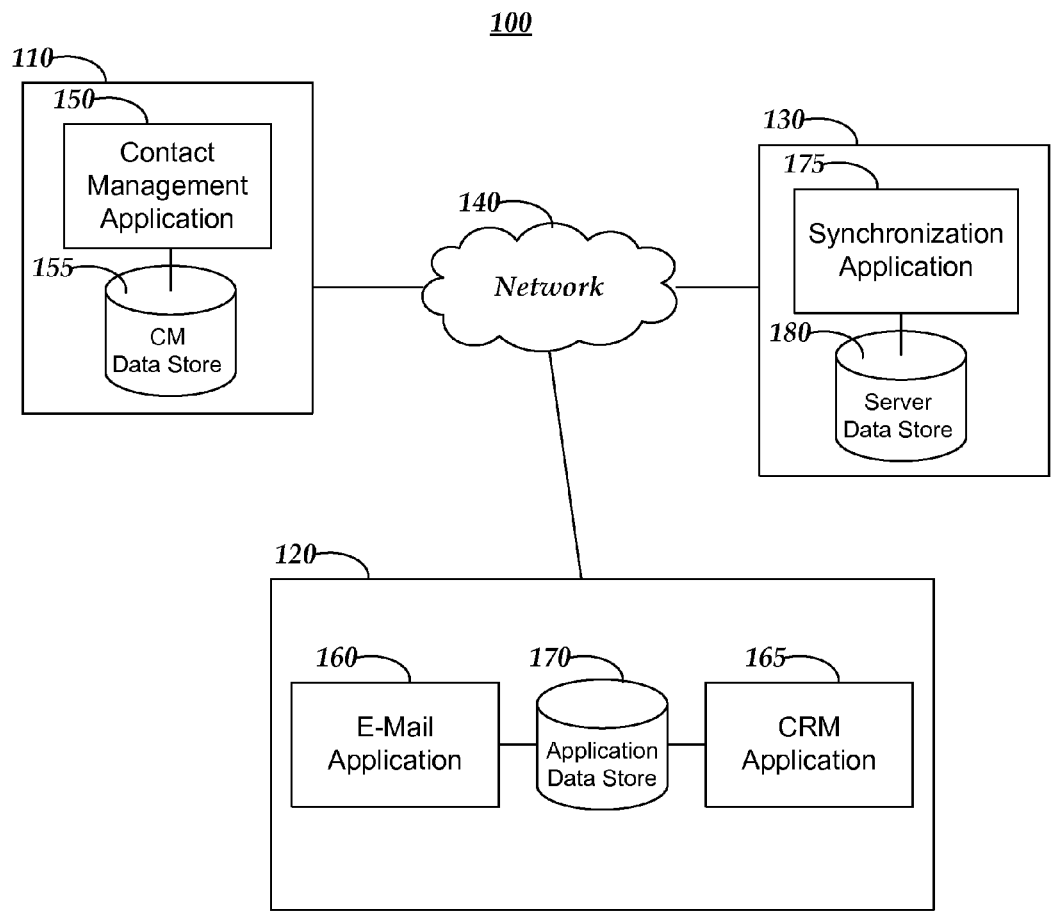

FIG. 1B is a block diagram further illustrating operating environment 100. Each of mobile device 110, personal computer 120, and/or data server 130 may comprise at least one application and/or data store. For example, mobile device 110 may comprise a contact management application 150 and a contact management data store 155; personal computer 120 may comprise an e-mail application 160, a customer relationship management (CRM) application 165, and/or an application data store 170; data server 130 may comprise a synchronization application 175 and/or a server data store 180. Consistent with embodiments of the invention, each of the applications may comprise a multi-threaded Messaging Application Programming Interface (MAPI) compliant application operative to create, read, update, and/or delete MAPI data objects in a coupled data store.

Messaging Application Programming Interface (MAPI) comprises a messaging architecture similar to a Component Object Model based API. MAPI may allow client programs to become (e-mail) messaging-enabled, -aware, or -based by calling MAPI subsystem routines that interface with certain messaging servers. MAPI comprises simple MAPI, a subset of 12 functions that may enable developers to add basic messaging functionality, and extended MAPI, which allows complete control over a messaging system on a client computer, creation and management of messages, management of the client mailbox, service providers, etc. MAPI includes facilities to access message transports, message stores, and/or directories.

Figure 2:
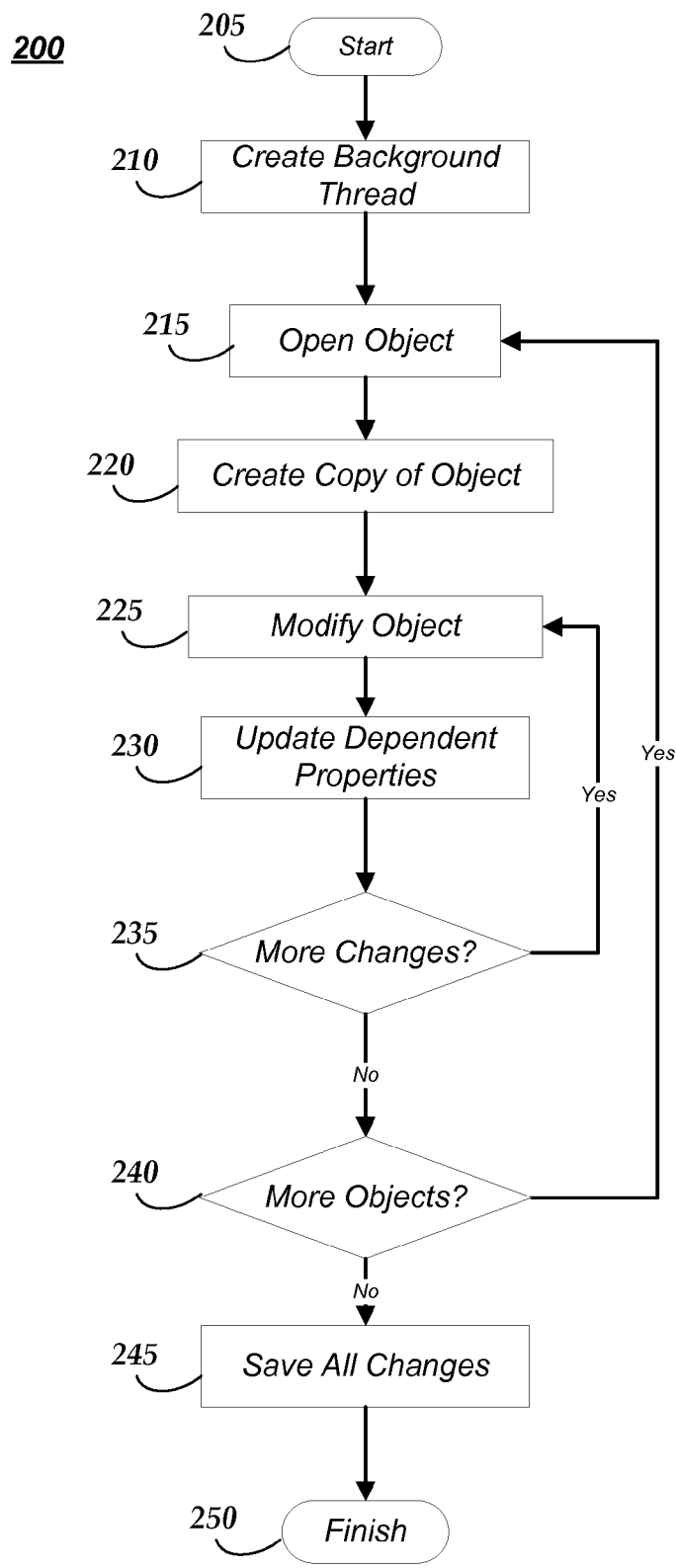
FIG. 2 is a flow chart of a method for providing background synchronization of data objects.

FIG. 2 is a flow chart setting forth the general stages involved in a method 200 consistent with an embodiment of the invention for providing background synchronization of data objects. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may create a background operation thread. For example, e-mail application 160 may comprise a main application thread and may receive a notification from CRM application 165 that a plurality of data operations are pending and may spawn a background thread for processing the data operations.

From stage 210, method 200 may advance to stage 215 where computing device 300 may open the first object. For example, the background thread of e-mail application 160 may open a first data object stored in application data store 170 associated with one of the pending plurality of data operations. Consistent with embodiments of the invention, the first data object may be opened without blocking the main thread of e-mail application 160 and/or preventing e-mail application 160 from interacting with and/or modifying the first data object.

From stage 215, method 200 may advance to stage 220 where computing device 300 may create a copy of the first object. For example, the background thread of e-mail application 160 may create a new MAPI object comprising each of the properties and values associated with the original object.

From stage 220, method 200 may advance to stage 225 where computing device 300 may modify the copy of the data object. For example, the data object may comprise a contact record comprising a plurality of properties such as name, address, phone number, e-mail, etc. A change to a contact's phone number may have been made in CRM application 165 and the value of the phone number property may be modified in the copy of the data object associated with that contact.

From stage 225, method 300 may advance to stage 230 where computing device 300 may update any dependent properties. For example, the data object may comprise a contact record and an update may be made to the contact's full name. Computing device 300 may determine whether any other data properties depend on the full name property, such as an initials property. If any properties depend on the updated property, those properties may be updated in turn.

From stage 230, method 200 may advance to stage 235 where computing device 300 may determine whether any other changes to the first object are pending. For example, changes to a contact record in CRM application may comprise a new phone number and an updated e-mail address. Once the first property (e.g., the phone number) is updated and propagated to any dependent properties, the background thread may return to stage 225 to update the next property if necessary.

Once all pending changes to the first object are made and propagated, method 200 may advance to stage 240 where computing device 300 may determine whether any more data objects are associated with pending changes. If so, method 200 may return to stage 215 and open a second data object for updating.

Once all pending changes to all objects associated with the plurality of data operations have been completed, method 200 may advance to stage 245 where computing device 300 may save the updated objects. For example, the background thread may replace data objects in application data store 170 with their corresponding updated copies.

Consistent with embodiments of the invention, computing device 300 may perform a conflict resolution if necessary. The conflict resolution may comprise determining whether a data object to be replaced with an updated copy has been modified since the copy was created. If so, computing device 300 may determine whether the modification to the copy of the first data object and the change to the first data object are each associated with a same property and, for example, discard the copy of the data object updated by the background thread or overwrite the changed data object with the updated copy according to a configuration value and/or a user input indicating which version to retain. If the modification to the copy of the first data object and the change to the first data object are not each associated with a same property, the copy of the data object may be discarded, a new copy may be created and updated with the pending change(s) as described above, and the data object may be replaced with the up to date copy. Method 200 may then end at stage 250.

An embodiment consistent with the invention may comprise a system for providing object synchronization. The system may comprise a memory storage and a processing unit coupled to the memory storage. The processing unit may be operative to create a background thread associated with an application, open a first data item associated with the application, create a copy of the first data item in the background thread, perform a modification to the copy of the first data item, and determine whether a second data item is associated with a pending modification. In response to determining that the second data item is not associated with a pending modification, the processing unit may be operative to replace the first data item with the modified copy of the first data item. The processing unit may be further operative to determine whether the first data item has been changed since the copy of the first data item was created and, if so, perform a conflict resolution between the first data item and the copy of the first data item.

Another embodiment consistent with the invention may comprise a system for providing object synchronization. The system may comprise a memory storage and a processing unit coupled to the memory storage. The processing unit may be operative to create an object processing thread associated with an application comprising at least one main thread, open a first object associated with the application by the object processing thread without blocking the at least one main thread, create a copy of the first object, modify a first property of the copy of the first object, and replace the first object with the copy of the first object. The processing unit may be further operative to update a user interface of the application to display the replaced first object, determine whether a second property comprises a dependency on the modified first property of the first object, and, if so, update the second property.

Yet another embodiment consistent with the invention may comprise a system for providing object synchronization. The system may comprise a memory storage and a processing unit coupled to the memory storage. The processing unit may be operative to create an object processing thread associated with an application comprising at least one main thread, wherein the application comprises a Messaging Application Programming Interface (MAPI) compliant e-mail client application, open a first object associated with the application by the object processing thread without blocking the at least one main thread, create a copy of the first object, modify a first property of the copy of the first object, determine whether at least one first pending modification is associated with a second property of the first object, and, if so, modify the second property of the copy of the first object and determine whether a second object is associated with at least one second pending modification. In response to determining that the second object is associated with the at least one second pending modification, the processing unit may be operative to create a copy of the second object, modify a property of the copy of the second object according to the at least one second pending modification, and replace the second object with the copy of the second object. The processing unit may be further operative to determine whether the first object has been changed since the copy of the first object was created and, if so, perform a conflict resolution between the first object and the copy of the first object. The processing unit may be further operative to replace the first object with the copy of the first object and update a user interface of the application to display the replaced first object.

Figure 3:
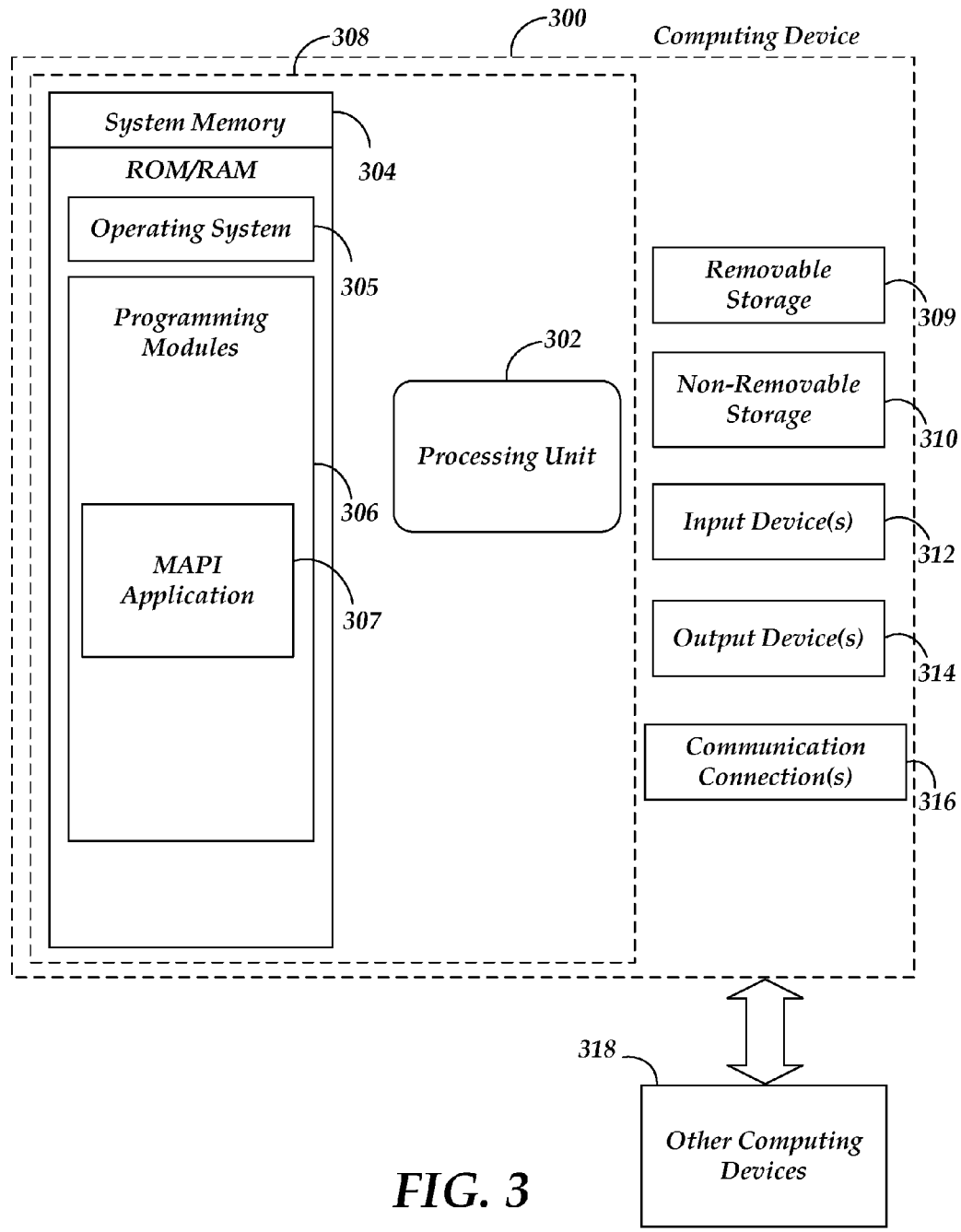
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a MAPI application 307 such as e-mail application 160. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g. MAPI application 307) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing object synchronization, the method comprising:
   creating a background thread associated with an application;
   opening a first data item associated with the application;
   creating a copy of the first data item in the background thread;
   performing a modification to the copy of the first data item;
   determining whether a second data item is associated with a pending modification; and
   in response to determining that the second data item is not associated with a pending modification, replacing the first data item with the modified copy of the first data item.

2. The method of claim 1, wherein the application comprises a Messaging Application Programming Interface (MAPI) compliant e-mail client application.

3. The method of claim 2, wherein the first data item comprises a MAPI object.

4. The method of claim 3, wherein the modification to the copy of the first data item comprises a change to a property of the MAPI object.

5. The method of claim 4, further comprising:
   determining whether the first data item has been changed since the copy of the first data item was created; and
   in response to determining that the first data item has been changed since the copy of the first data item was created, performing a conflict resolution between the first data item and the copy of the first data item.

6. The method of claim 5, wherein performing the conflict resolution between the first data item and the copy of the first data item comprises:
   determining whether the modification to the copy of the first data item and the change to the first data item are each associated with a same property; and
   in response to determining that the modification to the copy of the first data item and the change to the first data item are each associated with the same property, replacing the first data item with the copy of the first data item.

7. The method of claim 5, wherein performing the conflict resolution between the first data item and the copy of the first data item comprises:
   determining whether the modification to the copy of the first data item and the change to the first data item are each associated with a same property; and
   in response to determining that the modification to the copy of the first data item and the change to the first data item are each associated with the same property, discarding the copy of the first data item.

8. The method of claim 5, wherein performing the conflict resolution between the first data item and the copy of the first data item comprises:
   determining whether the modification to the copy of the first data item and the change to the first data item are each associated with a same property; and
   in response to determining that the modification to the copy of the first data item and the change to the first data item are not each associated with the same property:
   discarding the copy of the first data item,
   creating a second copy of the first data item,
   performing the modification to the second copy of the first data item, and
   replacing the first data item with the modified second copy of the first data item.

9. The method of claim 4, further comprising:
after performing a modification to the copy of the first data item, determining whether the first data item comprises at least one second pending modification; and
performing the at least one second pending modification to the copy of the first data item prior to determining whether the second data item is associated with the pending modification.

10. A computer-readable medium which stores a set of instructions which when executed performs a method for providing object synchronization, the method executed by the set of instructions comprising:
creating an object processing thread associated with an application comprising at least one main thread;
opening a first object associated with the application by the object processing thread without blocking the at least one main thread;
creating a copy of the first object;
modifying a first property of the copy of the first object; and
replacing the first object with the copy of the first object.

11. The computer-readable medium of claim 10, further comprising:
determining whether at least one pending modification is associated with a second property of the first object prior to replacing the first object with the copy of the first object; and
in response to determining that the at least one pending modification is associated with the second property of the first object, modifying the second property of the copy of the first object.

12. The computer-readable medium of claim 10, further comprising:
determining whether a second object is associated with at least one pending modification prior to replacing the first object with the copy of the first object; and
in response to determining that the second object is associated with a pending modification:
creating a copy of the second object;
modifying a property of the copy of the second object; and
replacing the second object with the copy of the second object.

13. The computer-readable medium of claim 10, wherein the application comprises a Messaging Application Programming Interface (MAPI) compliant e-mail client application.

14. The computer-readable medium of claim 13, wherein the first object comprises a MAPI object.

15. The computer-readable medium of claim 10, further comprising updating a user interface of the application to display the replaced first object.

16. The computer-readable medium of claim 15, further comprising:
determining whether a second property comprises a dependency on the modified first property of the first object;
in response to determining that the second object comprises the dependency on the modified first property of the first object, updating the second property.

17. The computer-readable medium of claim 16, further comprising updating the user interface of the application to display the updated second property.

18. The computer-readable medium of claim 10, further comprising:
prior to replacing the first object with the copy of the first object, determining whether the first object has been changed since the copy of the first object was created; and
in response to determining that the first object has been changed since the copy of the first data item was created, performing a conflict resolution between the first object and the copy of the first object.

19. The computer-readable medium of claim 18, wherein performing the conflict resolution between the first object and the copy of the first object comprises:
determining whether the change to the first object comprises a change to the first property of the copy of the first object; and
in response to determining that the change to the first object comprises the change to the first property of the copy of the first object, discarding the copy of the first object.

20. A system for providing object synchronization, the system comprising:
a memory storage; and
a processing unit coupled to the memory storage, wherein the processing unit is operative to:
create an object processing thread associated with an application comprising at least one main thread, wherein the application comprises a Messaging Application Programming Interface (MAPI) compliant e-mail client application,
open a first object associated with the application by the object processing thread without blocking the at least one main thread,
create a copy of the first object,
modify a first property of the copy of the first object,
determine whether a second property comprises a dependency on the modified first property of the first object, and
in response to determining that the second property comprises the dependency on the modified first property of the first object, update the second property according to the modified first property of the first object, determine whether at least one first pending modification is associated with a second property of the first object,
in response to determining that the at least one first pending modification is associated with the second property of the first object, modify the second property of the copy of the first object,
determine whether a second object is associated with at least one second pending modification,
in response to determining that the second object is associated with the at least one second pending modification:
create a copy of the second object,
modify a property of the copy of the second object according to the at least one second pending modification, and
replace the second object with the copy of the second object,
determine whether the first object has been changed since the copy of the first object was created,
in response to determining that the first object has been changed since the copy of the first data item was created, perform a conflict resolution between the first object and the copy of the first object,
replace the first object with the copy of the first object, and
update a user interface of the application to display the replaced first object.

* * * * *